United States Patent [19]

Standiford

[11] Patent Number: 5,737,147
[45] Date of Patent: Apr. 7, 1998

[54] TAPE TRANSPORT SYSTEM UTILIZING A COMPLIANT FRICTIONAL DRIVE ROLLER

[75] Inventor: Gregory A. Standiford, Loveland, Colo.

[73] Assignee: Hewlett-Packard Company, Palo Alto, Calif.

[21] Appl. No.: 714,973

[22] Filed: Sep. 17, 1996

Related U.S. Application Data

[63] Continuation of Ser. No. 374,355, Jan. 18, 1995, abandoned.

[51] Int. Cl.$^6$ ............................ G11B 15/32; G11B 15/675
[52] U.S. Cl. .................. 360/96.3; 360/96.5; 242/340; 242/352.4; 242/338.4
[58] Field of Search .................. 360/93, 96.1, 96.2, 360/96.3, 96.4, 96.5; 242/340, 352.4, 354, 354.1, 356.5, 356.7, 338.4

[56] References Cited

U.S. PATENT DOCUMENTS

| | | | |
|---|---|---|---|
| 3,692,255 | 9/1972 | Von Behren | 242/343.2 |
| 3,924,823 | 12/1975 | Cohen et al. | 242/339 |
| 3,976,262 | 8/1976 | Kennedy | 360/96.4 |
| 4,085,906 | 4/1978 | Dahl et al. | 242/354 |
| 4,099,686 | 7/1978 | Moya | 242/338.4 |
| 4,172,569 | 10/1979 | Newell | 242/343.2 |
| 4,303,955 | 12/1981 | Kramer et al. | 360/93 |
| 4,573,091 | 2/1986 | Barton, Jr. et al. | 360/93 |
| 4,608,615 | 8/1986 | Zeavin | 360/96.1 |
| 4,647,994 | 3/1987 | Irwin et al. | 360/85 |
| 4,984,111 | 1/1991 | Rudi | 360/96.5 |
| 5,210,664 | 5/1993 | Perona | 360/93 |
| 5,371,642 | 12/1994 | Bryer | 360/93 |
| 5,372,321 | 12/1994 | Ohkubo et al. | 242/340 |
| 5,415,361 | 5/1995 | Sato | 242/352.4 |
| 5,507,424 | 4/1996 | Kitajima et al. | 242/354 |

*Primary Examiner*—Craig A. Renner

[57] ABSTRACT

A tape drive has a tape transport system for use with a tape cartridge of the type having an exposed edge of the internal cartridge capstan. A stationary drive capstan fixedly mounted with respect to the tape drive chassis directly drives a compliant frictional drive roller connected thereto via a drive shaft. A combination of the compliance and friction characteristics of the drive roller material and/or the drive roller form factor achieves a contact pressure sufficiently high to engage the exposed edge of the internal cartridge capstan in order to transport the tape past a read/write head and yet sufficiently low to avoid damage to the tape cartridge or the tape drive.

8 Claims, 7 Drawing Sheets ial cartridge is positioned correctly. Whe
TAPE TRANSPORT SYSTEM UTILIZING A COMPLIANT FRICTIONAL DRIVE ROLLER This is a continuation of application Ser. No. 08/374,355 filed on Jan. 18, 1995, now abandoned.

BACKGROUND OF THE INVENTION

The present invention relates to magnetic tape drive systems, and more particularly, to a magnetic tape transport system having a spatially fixed compliant frictional drive roller for use with a tape cartridge of the type having an exposed edge of an internal cartridge capstan by which tape may be transported bidirectionally between two reels.

The basic purpose of a tape drive is to store and retrieve information onto magnetic tape. A surface coating of the tape, typically thinly applied over a mylar substrate, contains a magnetic recording material which is sensitive to magnetic fields generated by a magnetic read/write head located in the tape drive. During information storage, the read/write head converts electronic signals to magnetic fields via electromagnetic coils located within the read/write head. The magnetic fields, representing information to be stored as data in tracks on the tape, cause changes in the magnetic orientation of the magnetic particles on the tape. During information retrieval, the magnetic fields, generated by the magnetic particles, are converted to electric signals corresponding to the stored magnetic orientations of the particles on each track.

Information storage and recovery requires a tape transport system which is capable of critically maintaining a constant transport velocity of the magnetic tape across the read/write head. The mutual dependence of tape drives and tape cartridges require the designer of a tape transport system to take into account the internal tape transport mechanism of the type of tape cartridge used.

One conventional tape cartridge contains two reels whereby the magnetic tape stored on one reel is unwound, transported across a read/write head, and wound upon a second reel. The reels of the cartridge fit over two spindles located in the tape drive, each of which is independently driven by a separate motor. The torque required for a driving reel to take up tape varies with the radius of the tape already on the "takeup" reel, and with the tension of the tape supplied from the "supply" reel. The tension of the tape from the supply reel, however, also varies with the amount of tape on its reel, thus adding considerable complexity. The amount of torque required to spin the reels, and thus the amount of current to be supplied thereto, increases as more and more tape is wound onto the takeup reel. For operations such as rewinding, fast-forwarding, and searching the tape at high speeds, where constant tape velocity is not critical, a simple open-loop system design works well. For reading and writing operations, however, which require a constant tape velocity critical for tracking purposes to avoid data errors in retrieving information from the tape, a different solution is desirable.

One solution to the cumbersome design problem posed by the foregoing reel control system for maintaining a constant linear tape velocity is to use a separate system altogether which is independent of tape reel diameter. Conventional systems utilize a motor driven capstan and pinch roller combination located within the drive. When the cassette tape is inserted into a drive containing a conventional tape transport system, the magnetic tape is located between the capstan and pinch roller. During operations requiring tape movement, the pinch wheel engages the magnetic tape against the capstan with sufficient contact pressure to prevent tape slippage and to allow the motorized rotating capstan to control the speed of the tape. The advantage of having a separate capstan system for tape transport operations requiring constant tape velocity is the added ease of designing a motor control system which has a constant roller diameter and torque requirement. A simple closed-loop control system which monitors the tape velocity through the use of a tachometer adjusting the capstan torque accordingly, efficiently maintains a constant tape velocity at the desired operating point. Disadvantages, however, include the requirement of separate systems for reel transport operations and for capstan transport operations. In addition, the typical mechanism required for initial engagement of the magnetic tape between the capstan and pinch roller involves the coordinated movement of various arms, levers and solenoids, adding both complexity and expense.

Another cartridge design, disclosed in U.S. Pat. No. 3,692,255 to Von Behren, et. al., and U.S. Pat. No. 4,172,569 to Newell, incorporates an internal capstan and an endless loop drive belt system which eliminates the separate reel transport mechanism and allows bidirectional transport of tape by driving the exposed edge of the internal cartridge capstan. The internal cartridge capstan generally comprises a roller having a flat cylindrical disc shape and having a rubberized surface to provide desired friction when a rotating drive roller is urged against it. Such cartridges have two spaced apart reels for winding tape and a plurality of guide rollers for supporting an endless loop drive belt which contacts the peripheral tape roll regions. Two of the guide rollers are usually at opposite rear corners of the cartridge, while a third guide roller, which also functions as the internal cartridge capstan, is at a forward central region of the cartridge, generally in between the two tape reels. An external rotating drive roller, when applied with sufficient pressure to the periphery of the internal cartridge capstan, causes the drive belt to move, which in turn, causes tape motion.

Prior art tape drives designed for use with said tape cartridge types have been disclosed in U.S. Pat. No. 3,924,823 to Cohen, et. al.; U.S. Pat. No. 4,647,994 to Irwin, et. al.; U.S. Pat. No. 4,984,111 to Rudi; and U.S. Pat. No. 5,210,664 to Perona. These disclosures, reveal various methods of achieving sufficient contact pressure between the internal cartridge capstan and the external drive roller in order to supply the required torque to move the tape.

In a tape drive consisting of a manual tape cartridge docking apparatus, wherein the tape cartridge is positioned against the drive roller, read/write head, erase head, and other sensors entirely through manual and mechanical means, the desired contact pressure between the internal cartridge capstan and the drive roller is supplied through some type of spring mechanism. In these manual tape cartridge docking systems, the tape cartridge is manually inserted into the drive and guided by a pair of side guide rails. As the cartridge is inserted further into the drive, it contacts two spring-loaded metallic ball rollers, which, upon additional manual pressure, lock the cartridge into place. Various known configurations of drive roller assemblies then supply the required contact pressure to properly engage the internal cartridge capstan for tape movement.

One configuration of drive roller assembly includes a pivot mechanism. When the cartridge is inserted into the tape drive, the cartridge contacts the drive roller slightly before moving into final cartridge position. The motor is pivotally mounted and rotationally biased towards the capstan by a spring, and becomes vertical as the internal cartridge capstan biases against the drive roller of the tape drive, thereby achieving the required driver contact pressure.

Another configuration of drive roller assembly includes a sliding spring mechanism. In such an assembly, the drive roller and motor are mounted on a sliding plate. Again, when the cartridge is inserted into the tape drive, the cartridge contacts the drive roller slightly before moving into final position. In this configuration, the required contact pressure is achieved by a spring biasing the sliding mounted assembly against the internal cartridge capstan as it locks into final position.

Yet another drive roller assembly configuration maintains a fixed position drive roller, but includes an automatic cartridge insertion system which employs a motorized swivel arm to automatically draw the cartridge into the drive against the capstan which engages the drive roller. This system requires an automatic swivel arm assembly for cartridge insertion, adding complexity and cost to the overall tape drive.

The trend in the computer peripherals industry has been towards smaller components and smaller form factors. The requirement for space-saving techniques has lead to alternative drive roller assembly configurations. In order to fit within the industry's 1 inch form factor standard, one space-saving technique involves placing the motor on the same plane as the drive roller, and driving it indirectly through the use of a duplicate motor driven shaft interconnected to the drive motor shaft by a drive belt. This system incorporates a sliding spring-loaded assembly mechanism to achieve the required contact pressure.

SUMMARY OF THE INVENTION

In light of the foregoing problems encountered in the art, it is a principal object of this invention to provide an efficient tape transport system for driving a tape cartridge of the type having an exposed edge of an internal cartridge capstan by which tape within the cartridge is transported from one reel, across a read/write head, to a second reel.

It is another object of this invention to reduce the space required by the drive roller assembly in a tape transport system.

It is yet another object of this invention to provide a tape drive which fits within the 1 inch industry standard form factor.

It is still another object of this invention to reduce the number of parts required by the drive roller assembly of said tape transport system.

It is another object of this invention to eliminate an external spring mechanism for providing the required contact pressure between the drive roller of the tape drive and the internal cartridge capstan of the tape cartridge.

It is yet another object of this invention to reduce the cost of the drive roller assembly.

These and other objects of this invention are accomplished by a tape transport system for use with a tape cartridge of the type having an internal cartridge capstan with an exposed edge.

Disclosed is a tape drive having a tape transport system for use with a tape cartridge of the type having an exposed edge of the internal cartridge capstan. A stationary drive capstan fixedly mounted with respect to the tape drive chassis directly drives a compliant frictional drive roller connected thereto via a drive shaft. A combination of the compliance and friction characteristics of the drive roller material and/or the drive roller form factor achieves a contact pressure sufficiently high to engage the exposed edge of the internal cartridge capstan in order to transport the tape past a read/write head and yet sufficiently low to avoid damage to the tape cartridge or the tape drive.

BRIEF DESCRIPTION OF THE DRAWING

An illustrative and presently preferred embodiment of the invention is shown in the accompanying drawings in which.

DETAILED DESCRIPTION OF THE INVENTION

Figure 1:
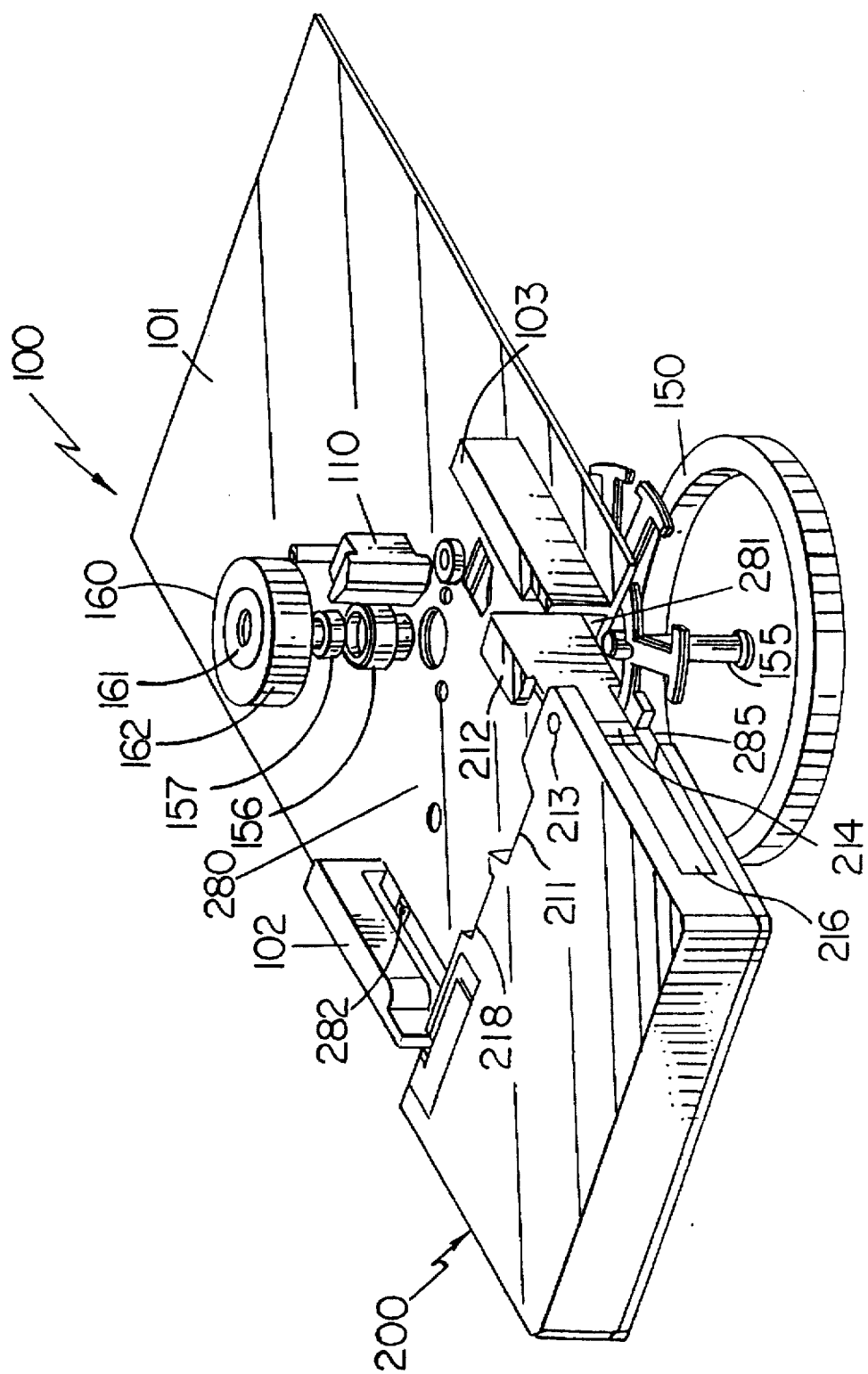
FIG. 1 is a fragmentary view taken from the front right of a tape drive in accordance with the invention, with the top cover, electronics circuitboard and the read/write head motor assembly having been removed to show internal details.

The drawing, in general, depicts a tape drive 100 for driving magnetic tape 260 in a cartridge 200 of the type having an internal cartridge capstan 250 with an exposed edge surface, comprising a cartridge docking bay 280, a motor driven drive roller shaft 155 mounted in a spatially fixed relationship with said cartridge docking bay 280, and a compliant frictional drive roller 160 mounted on said drive roller shaft 155.

Figure 2:
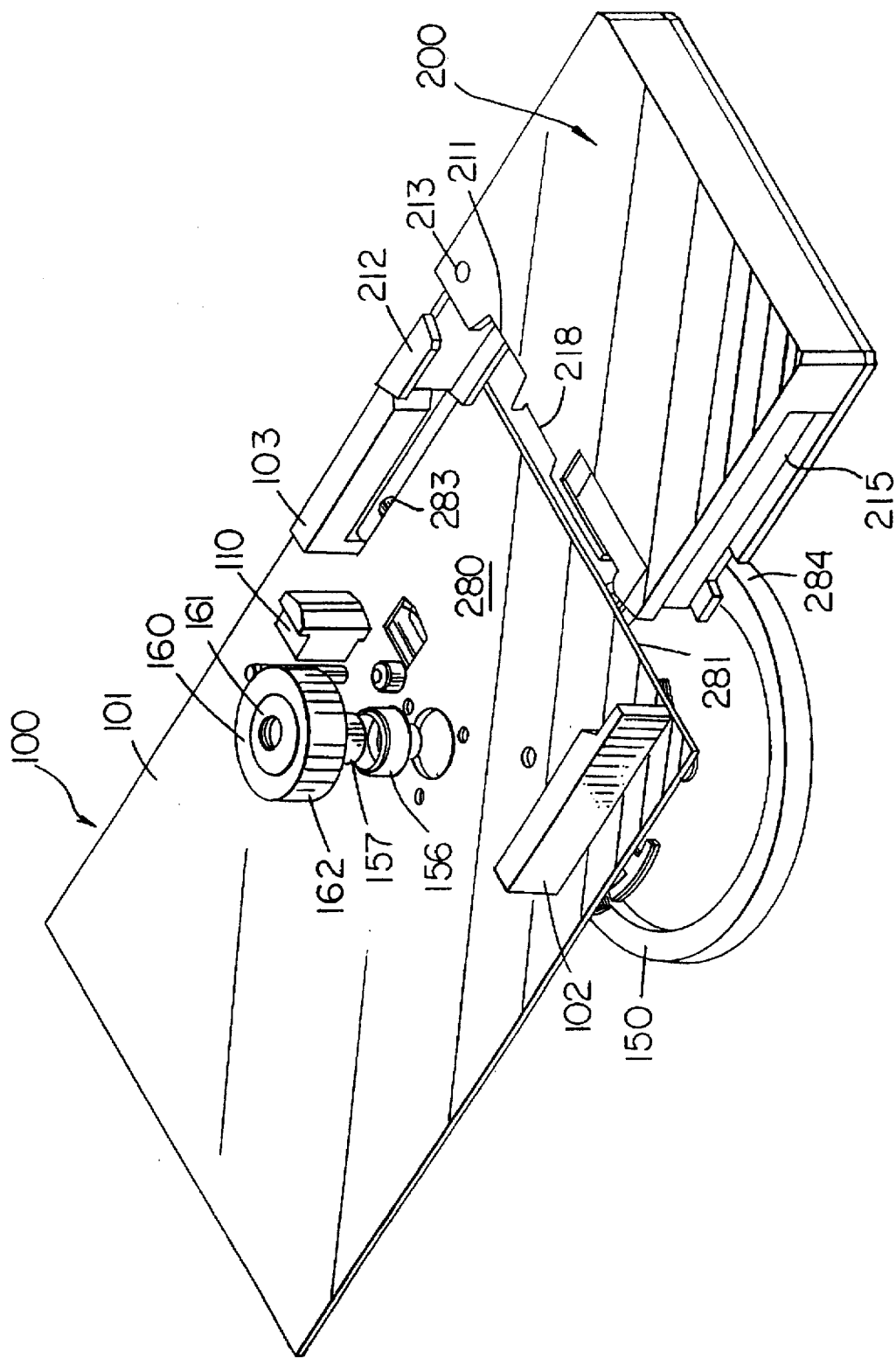
FIG. 2 is a fragmentary view taken from the front left of the tape drive depicted in FIG. 1.
Figure 3:
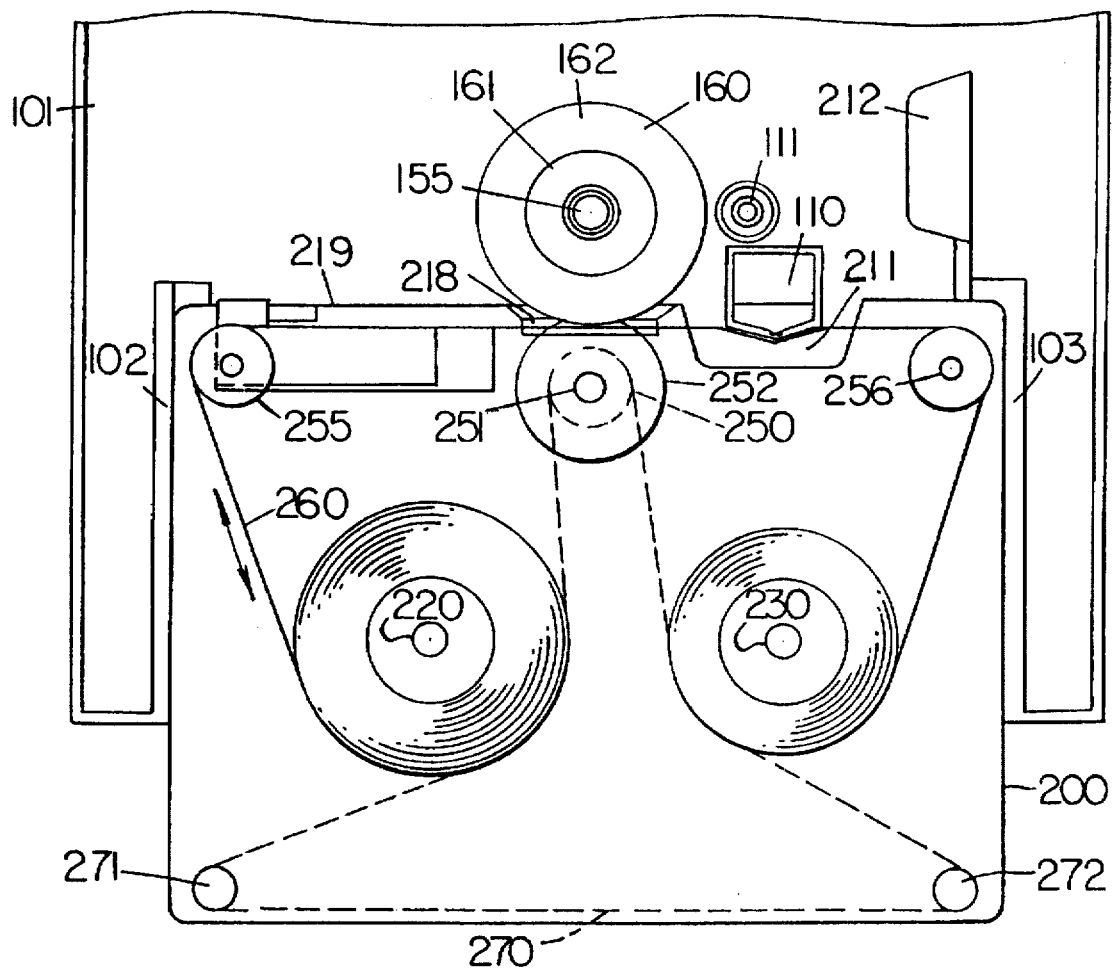
FIG. 3 is a top plan view of the tape drive depicted in FIG. 1 with a tape cartridge inserted in the drive and showing the internals of the tape cartridge.

Turning now in detail to the drawing, FIGS. 1, 2 and 3 depict a tape drive 100 having the top cover, electronics circuitboard and the read/write head motor assembly removed to reveal the internal details of the invention. The tape drive 100 has a tape transport system mounted on a generally rectangular chassis 101. The tape drive 100 is designed for use with magnetic tape cartridge 200, having an internal cartridge capstan 250 with one edge exposed at cartridge capstan opening 218.

With reference to FIG. 3, the magnetic tape cartridge 200 comprises a small narrow rectangular box having all access for reading and transporting the tape provided along one peripheral edge 219 of the magnetic tape cartridge 200. The magnetic tape cartridge 200 contains a supply reel 220 and a takeup reel 230 for winding and unwinding the magnetic tape 260. The magnetic tape 260 moves between the supply reel 220 and takeup reel 230 around two tape guide pillars 255 and 256 arranged in the two opposite front corners of the tape cartridge 200. The tape cartridge 200 additionally contains two drive belt guides 271 and 272 arranged in the opposite rear corners of the tape cartridge 200. With additional reference to FIG. 4, FIG. 5, and FIG. 6, the internal cartridge capstan 250 comprises an internal cartridge capstan puck 252 mounted on the upper end of an internal cartridge capstan shaft 251. The internal cartridge capstan perimeter 252 is generally flat and cylindrical having a resilient surface often comprising a urethane rubber material to provide good traction. The internal cartridge capstan 250 is located at the front center of the tape cartridge 200 having the outer periphery of the internal tape cartridge capstan 252 exposed through the cartridge capstan opening 218. The internal tape cartridge capstan shaft 251 and the two drive belt guides 271 and 272 support an endless loop drive belt 270. The endless loop drive belt 270 contacts the inner peripheries of the magnetic tape 260 which is wound about the supply reel 220 and takeup reel 230. Rotation of the internal cartridge capstan 250, by way of an external rotating drive roller associated with a motor, drives the endless loop drive belt 270, having sufficient contact pressure with the inner peripheries of the magnetic tape wound around the supply and takeup reels 220 and 230 to cause tape movement.

The magnetic tape cartridge 200 also includes a protective door 212 provided at the front peripheral edge 219 of the magnetic tape cartridge and covering the read/write head opening 211 when the magnetic tape cartridge 200 is not inserted in the drive. The protective door 212 is hinged at the right front corner 213 of the magnetic tape cartridge 200. When the magnetic tape cartridge 200 is first inserted into the tape drive 100, the protective door 212 forms a 90° angle with a right guide rail notch 216, FIG. 1. The door 212 has a segment 214 extending past the hinge 213 and blocking the right guide rail notch opening at the front peripheral edge of the magnetic tape cartridge 200. Thus, when the magnetic tape cartridge 200 is inserted into the drive, the right guide rail 103 hits the extended segment 214 of the protective door 212, forcing the protective door 212 open as the magnetic tape cartridge 200 is inserted further and further into the tape drive 100, until finally forming a 180° angle with the right guide rail notch 216 when the tape cartridge 200 reaches final position. At this point the magnetic tape 260 is completely exposed through the read/write head opening 211 in the magnetic tape cartridge 200, contacting the read/write head 110.

It will be noted that the magnetic tape cartridge 200 detailed in the preferred embodiment is a DC 2000 style Mini Data Cartridge Tape. Various manufacturers, including 3M, Sony, and Verbatim, among others, produce compatible tape cartridges of this style. However, the present invention is not restricted to the use of said tape cartridges, but may be applied to any magnetic tape cartridge having at least one internal cartridge capstan rotatable by externally driving an exposed edge of the internal cartridge capstan which in turn causes lateral tape transport past a read/write head.

Inherent in the preferred embodiment but not limiting the present invention is a docking bay 280 for holding the magnetic tape cartridge 200 firmly in place against the read/write head 110 and the compliant frictional drive roller 160. FIG. 1 and FIG. 2 illustrate how the docking bay 280 is mounted on the chassis 101 underneath and between the left guide rail 102 and the right guide rail 103. In the preferred embodiment, the docking bay 280 comprises a metal mounting plate 281 for attaching to the chassis 101, a left spring-loaded roller 282 and a right spring-loaded roller 283. When the docking bay 280 is mounted on the chassis 101, the left spring-loaded roller 282 is aligned underneath the left guide rail 102, while the right spring-loaded roller 283 is aligned underneath the right guide rail 103. When a magnetic tape cartridge 200 is inserted into the docking bay 280, the left guide rail 102 fits into the left guide rail notch 215 of the magnetic tape cartridge 200 while the right guide rail 103 initially encounters the extended segment 214 of the protective door 212. The right guide rail 103 fits into the right guide rail notch 216 of the magnetic tape cartridge 200 as the protective door 212 is opened when the magnetic tape cartridge 200 is inserted further into the tape drive 100. The left and right guide rails 102 and 103 guide the magnetic tape cartridge 200 up against the left and right spring-loaded rollers 282 and 283. Additional manual pressure on the tape cartridge 200 overcomes a barrier force produced by the spring-loaded rollers 282 and 283, thereby allowing the magnetic tape cartridge 200 to pass over them. When the tape cartridge 200 is fully inserted into the docking bay 280, the left spring-loaded roller 282 fits into the left latching notch 284 and the right spring-loaded roller 283 fits into the right latching notch 285, thereby locking the magnetic tape cartridge 200 firmly into place. In this final position, the protective door 212 is completely open, exposing the magnetic tape 260 such that it physically contacts the read/write head 110. Additionally, the exposed peripheral edge of the internal cartridge capstan 250 firmly engages an external compliant frictional drive roller 160.

Turning now to the tape transport system of the drive, and depicted in FIG. 1 and FIG. 2, there is provided a compliant frictional drive roller 160 directly driven by a drive motor 150. The drive motor 150 is mounted underneath the drive 101. The drive motor 150 supports a vertically mounted drive roller shaft 155. The lower end of the drive roller shaft 155 is mounted on the drive motor 150 via a bearing 157 and bearing housing 156 pair. The compliant frictional drive roller 160 is fixedly mounted on the other upper end of the drive roller shaft 155. The drive roller shaft 155 is mounted in the center of the drive motor 150 such that rotation of the drive motor 150 directly drives the drive roller shaft 155 and in turn directly drives the compliant frictional drive roller 160. In the preferred embodiment, the drive motor 150 is a direct drive thin brushless motor. Although a preferred motor configuration has been described, it will be appreciated that any motor with suitable electrical specifications and desired dimensions may be employed. It will also be appreciated that the efficient manner of mounting the drive motor 150 underneath the chassis 101 frees up valuable space within the tape drive 100 which may contribute to achieving smaller and smaller form factors. Additionally, the mounting scheme further eliminates the need for a duplicate drive shaft/belt system or drive shaft/roller system required in prior systems where the motor is mounted on top of the chassis. This mounting scheme minimizes the number of parts, cost, and complexity of the tape transport system, and in addition reduces problems related to component tolerances and wear characteristics. However, it is to be understood that any other motor mounting systems, including all conventional mounting systems, may be used.

A further feature of the tape drive 100 is the compliant frictional drive roller 160 itself. Through material and/or form factor selection, the fixedly mounted compliant frictional drive roller 160 engages the internal cartridge capstan 250 with sufficient contact pressure to move the magnetic tape 260 without the use of a spring. Prior art drive roller assemblies utilize moving spring mechanisms (e.g. a pivoting mechanism, or a sliding assembly mechanism) to achieve suitable contact pressure for engaging the internal cartridge capstan 250. The design of tape drive 100 allows the tape drive capstan (which in the preferred embodiment is drive roller shaft 155) and associated drive roller 160 to be fixedly positioned with respect to the chassis 101 and docking bay 280 while directly driving the compliant frictional drive roller 160 which in turn engages the internal cartridge capstan 250 with sufficient contact pressure to transport the magnetic tape 260. With this design, the tape cartridge 200, after insertion, also is maintained in fixed relationship with the chassis 101 and docking bay 280. Thus, no external spring is required for biasing either the tape drive capstan 155 with respect to the tape cartridge 200 or the tape cartridge 200 with respect to the tape drive capstan 155. This tape drive design thus has the advantage of reducing the number of moving parts subject to mechanical breakdown.

The compliant frictional drive roller 160 comprises an inner core 161 and an outer compliant frictional tire 162. The inner core 161 forms a toroidal inner tire mounted directly onto the outer periphery of the upper end of the drive roller shaft 155. In the preferred embodiment, the inner core 161 is composed of an aluminum material such as Aluminum 2024-T4 or 2011-T3. However, any other material having sufficient strength, mass and durability characteristics might be employed. The inner core 161 supports an outer compliant frictional tire 162, mounted around its outer periphery. The composition of the outer compliant frictional tire 162, through material and/or form factor selection, provides the desired compliance/friction characteristics to engage and drive the internal cartridge capstan 250 of the tape cartridge 200 when it is inserted into final position in the tape drive 100. (As used herein in reference to the frictional tire 162, the phrase "form factor" refers to the geometric configuration of the compliant frictional tire.)

Figure 4:
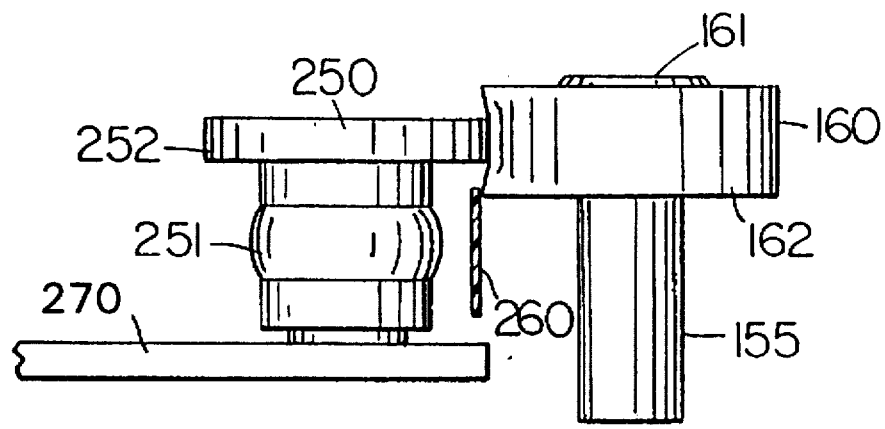
FIG. 4 is a sectional side elevation view of an example of a design drive roller engaging an internal cartridge capstan.
Figure 5:
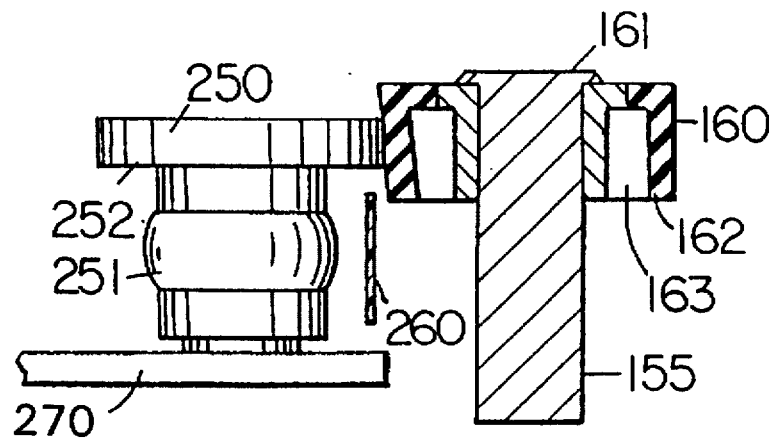
FIG. 5 is a sectional side elevation view of an example of a hollow design drive roller engaging the internal cartridge capstan.

In one embodiment, the outer compliant frictional tire 162 achieves the desired compliance/friction characteristics entirely through the choice of material employed in the compliant frictional tire 162. FIG. 4 depicts a first embodiment of a compliant frictional drive roller with an outer compliant frictional tire composed of a soft foamy material with durometer (Shore A) in the range 20 to 30. In the preferred embodiment, the material is a urethane rubber with durometer 22. The form factor of the compliant friction driver roller 160 of this first embodiment is generally cylindrically toroidal. In this embodiment, a typical tire 162 outer diameter may be 0.872 inches and the tire height may be 0.220 inches for use in association with a tape capstan perimeter 252 having a diameter of 0.625 inches and a height of 0.100 inches. A typical inward deflection of the outer surface of the tire is 0.020 inches ±0.008 inches. The typical force applied by the tire 162 against the tape internal capstan perimeter is about 1.1 lb. ±0.3 lb., which is sufficient to provide driving engagement between capstan perimeter 252 and tire 162 without damaging either the fixed tape drive shaft/capstan 155, or the fixed internal cartridge capstan 250.

Figure 7:
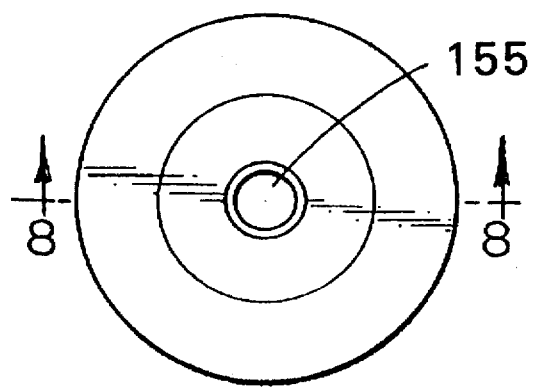
FIG. 7 is a top plan view of a hollow design drive roller.
Figure 8:
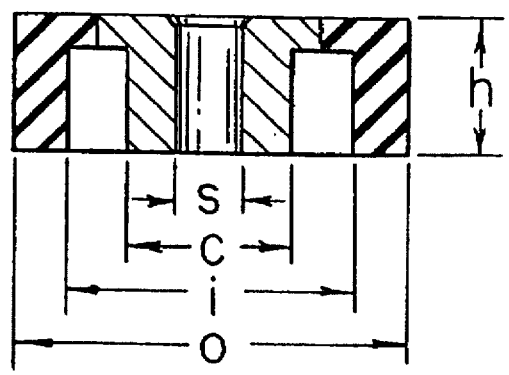
FIG. 8 is a side sectional view of a hollow design drive roller.
Figure 9:
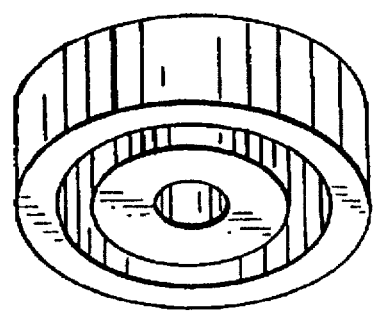
FIG. 9 is an isometric view of a hollow design drive roller.

With reference to FIG. 4, the cylindrically toroidal compliant frictional drive roller 160 may result in the lower outer edge of the outer compliant frictional tire 162 making contact with the magnetic tape 260 being transported underneath the internal cartridge capstan 250. Another embodiment of the compliant frictional drive roller 160 precludes tape contact by achieving the desired compliance/frictional characteristics essentially through the form factor choice employed in the outer compliant frictional tire 162. FIG. 5, FIG. 7, FIG. 8 and FIG. 9 depict a hollow compliant frictional drive roller. The outer compliant frictional tire 162 comprises a harder material with durometer in the range 60 to 80 (Shore A) with a hollow toroidal inner cavity 163 open to the bottom. FIG. 7, FIG. 8 and FIG. 9 depict one preferred embodiment, with a hard urethane rubber material having a durometer of 74±5 Shore A, and dimensions as follows. The drive shaft diameters is in the range 0.125 to 0.188 inches, and is most preferably 0.1570 inches. The inner core diameter c comprises a range of 0.225 to 0.500 inches and is most preferably 0.370 inches. The inner tire diameter i is in the range 0.500 to 0.750 inches and is most preferably 0.645 inches. The outer tire diameter o is in the range 0.625 to 0.875 inches and is most preferably 0.872 inches. The compliant frictional tire height h is in the range 0.200 to 0.400 inches and is most preferably 0.330 inches. As will be seen from FIG. 5, the compliance friction characteristics are sufficient to engage and drive the internal cartridge capstan 250, while at the same time the form factor causes the lower edge of the outer compliant frictional tire to pull inward towards the drive roller shaft 155 and away from the magnetic tape 260 running underneath the internal cartridge capstan 250.

Figure 6:
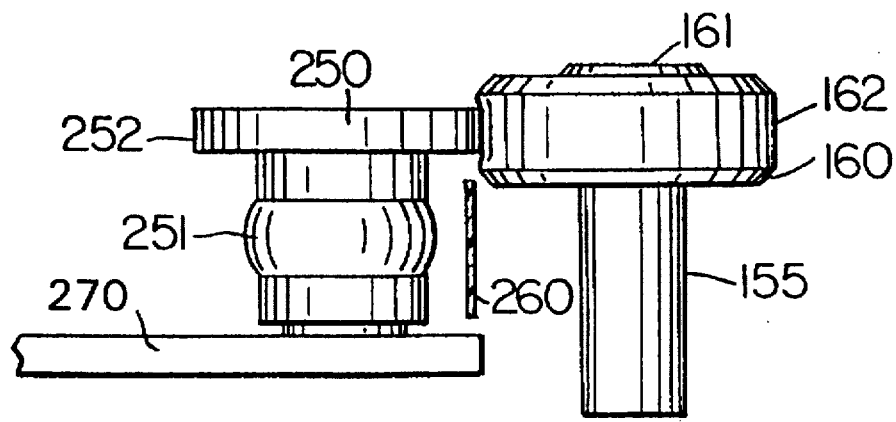
FIG. 6 is a sectional side elevation view of an example of a chamfered design drive roller engaging the internal cartridge capstan.
Figure 10:
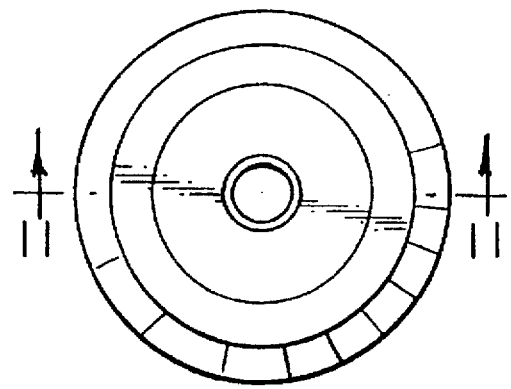
FIG. 10 is a top plan view of a first example of a chamfered design drive roller.
Figure 11:
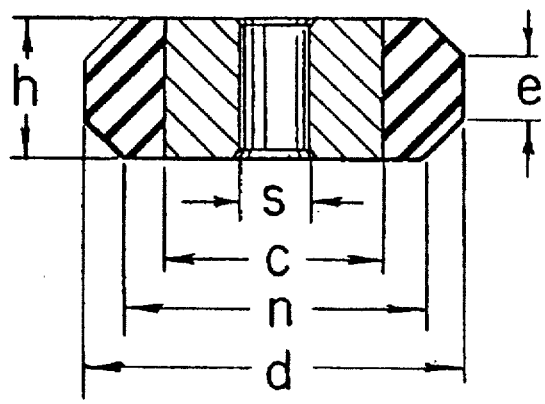
FIG. 11 is a side sectional view of the first example of a chamfered design drive roller.
Figure 12:
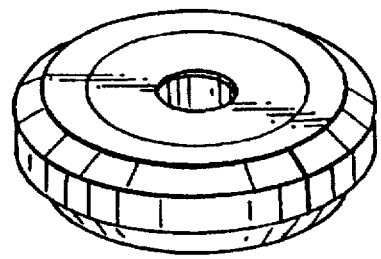
FIG. 12 is an isometric view of the first example of a chamfered design drive roller.
Figure 13:
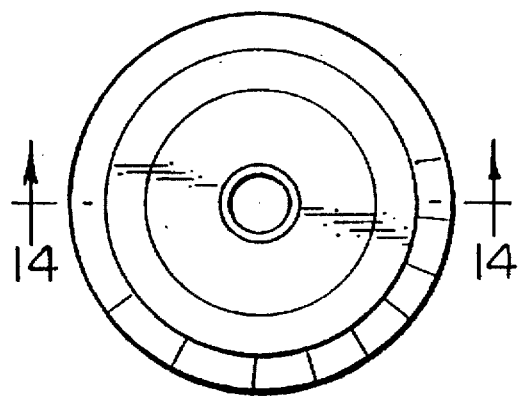
FIG. 13 is a top plan view of a second example of a chamfered design drive roller.
Figure 14:
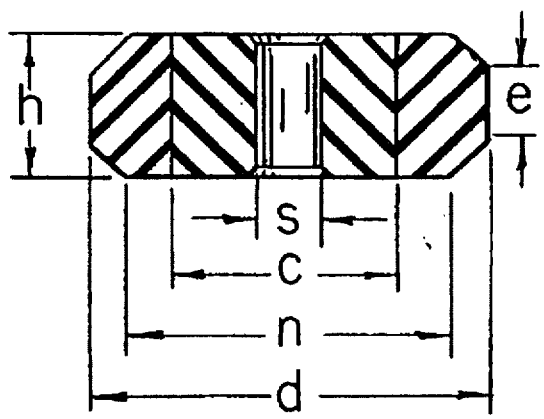
FIG. 14 is a side sectional view of the second example of a chamfered design drive roller.
Figure 15:
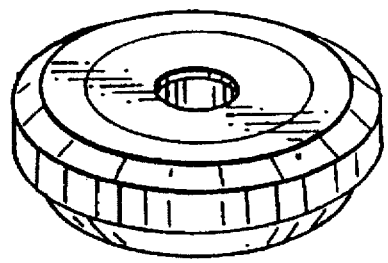
FIG. 15 is an isometric view of the second example of a chamfered design drive roller.

Another embodiment of the outer compliant frictional tire 162 utilizes a combination of material and form factor choice to achieve the desired compliance/friction characteristics. FIGS. 6, 10, 11, 12, 13, 14 and 15 depict a chamfered design. In this design, the compliance/friction characteristics are achieved entirely through the material composition. In addition, the chamfered design precludes tape contact via an appropriate form factor. In the preferred embodiment, the portion of the outer compliant frictional tire 162 engaging the internal cartridge capstan 250 has a larger diameter than the non-engaging portions. With reference to FIG. 6, the smaller-diameter non-engaging portions of the outer compliant frictional tire 162 are cut away inwardly from the larger-diameter engaging portion, thus avoiding tape contact. The preferred embodiment of the chamfered design employs a urethane rubber having a durometer in the range 25 to 50 (Shore A). FIGS. 10, 11 and 12 depict one preferred embodiment of the chamfered design composed of microcellular urethane having a durometer of 30±3 (Shore A), and dimensions as follows. The drive shaft diameter s is in the range 0.125 to 0.188 inches, and is most preferably 0.1572 inches. The inner core diameter c comprises a range of 0.375 to 0.750 inches and is most preferably 0.675 inches. The non-engaging outer tire diameter n is in the range 0.575 to 0.850 inches and is most preferably 0.822 inches. The engaging outer tire diameter d is in the range 0.625 to 0.875 inches and is most preferably 0.872 inches. The compliant frictional tire height h is in the range 0.182 to 0.380 inches and is most preferably 0.225 inches. The engaging portion of the outer tire height e is in the range 0.080 to 0.150 inches and is most preferably 0.085 inches. FIGS. 13, 14 and 15 depict a second preferred embodiment of the chamfered design composed of millable polyether urethane having a durometer of 45 ±5 Shore, and dimensions as follows. The drive shaft diameter s is in the range 0.125 to 0.188 inches, and is most preferably 0.1572 inches. The inner core diameter c comprises a range of 0.375 to 0.750 inches and is most preferably 0.500 inches. The non-engaging outer tire diameter n is in the range 0.575 to 0.850 inches and is most preferably 0.822 inches. The engaging outer tire diameter d is in the range 0.625 to 0.875 inches and is most preferably 0.872 inches. The compliant frictional tire height h is in the range 0.180 to 0.380 inches and is most preferably 0.225 inches. The engaging portion of the outer tire height e is in the range 0.080 to 0.150 inches and is most preferably 0.085 inches. The surface deflections and forces exerted using this design may be comparable to those described for the first tire embodiment.

It will be noted that the foregoing compliant frictional drive roller designs are disclosed by way of example and not limitation. Any suitable combination of drive roller material and/or form factor selection which will achieve the desired compliance/friction characteristics in a fixed-position direct drive tape transport system may be used to embody the present invention.

Based upon the foregoing detailed description, the present invention provides an efficient, low-cost, minimal-component, space-saving tape transport system for driving the magnetic tape of a tape cartridge having an externally exposed edge of an internal cartridge capstan.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A tape drive for driving magnetic tape in a cartridge of the type having an internal cartridge capstan with an exposed edge surface and a plurality of latching notches, comprising:

a cartridge docking bay mounted in a rigidly fixed position within a tape drive housing, said cartridge docking bay comprising a pair of guide rails for guiding the cartridge upon insertion into the cartridge docking bay and a plurality of spring-loaded rollers strategically placed to fit into said plurality of latching notches of said cartridge and to lock the cartridge into a rigidly fixed position when the cartridge is fully inserted into the docking bay;

a motor driven drive roller shaft mounted in a spatially fixed relationship with said cartridge docking bay; and a compliant frictional drive roller mounted on said drive roller shaft for solely providing sufficient frictional force to drivingly engage said exposed edge surface of said internal cartridge capstan when said cartridge is mounted in said docking bay, said compliant frictional drive roller comprising an inner core mounted on said drive roller shaft and an outer compliant frictional tire connected peripherally around said inner core, and said outer compliant frictional tire comprising a hollow inner cavity which spaces a lower portion of said outer compliant frictional tire from said inner core, wherein said hollow inner cavity permits said lower portion of said compliant frictional tire to deflect away from said magnetic tape upon engagement of said outer compliant frictional tire with said internal cartridge capstan to prevent engagement of said outer compliant frictional tire with said magnetic tape.

2. The tape drive of claim 1 wherein said compliant frictional drive roller has a generally cylindrical outer surface, a portion of which engages said exposed edge surface of said internal cartridge capstan when said cartridge is mounted in said docking bay.

3. The tape drive of claim 1 wherein said outer compliant frictional tire comprises:

a urethane rubber material.

4. The tape drive of claim 1 wherein said outer compliant frictional tire comprises:

a urethane rubber material with durometer range 25 to 80 Shore A.

5. The tape drive of claim 1 wherein said inner core comprises:

a metallic material.

6. The tape drive of claim 1 wherein said inner core comprises:

a plastic material.

7. The tape drive of claim 1 further comprising:

a magnetic read/write head assembly.

8. The tape drive of claim 7 wherein the read/write head assembly physically contacts the magnetic tape through an external opening in said tape cartridge.

* * * * *